Dec. 22, 1959     A. R. GRAD     2,918,338

PISTON AND CONNECTING ROD ASSEMBLY

Filed Nov. 18, 1957

INVENTOR
ADOLF R. GRAD
BY T. Lloyd LaFave
ATTORNEY

United States Patent Office

2,918,338
Patented Dec. 22, 1959

2,918,338
PISTON AND CONNECTING ROD ASSEMBLY

Adolf R. Grad, Milwaukee, Wis., assignor to The Oilgear Company, Milwaukee, Wis., a corporation of Wisconsin Application November 18, 1957, Serial No. 697,266

7 Claims. (Cl. 309—20)

This invention relates to a hydrodynamic machine operable as a hydraulic pump or as a hydraulic motor. More particularly, the invention relates to the piston and connecting rod assemblies for such a machine.

In an axial type hydrodynamic machine, such as a swash plate type of machine, angle type, and wobble plate type, piston and connecting rod have relative universal movement, and where an end head of the connecting rod enters the piston cylinder there has heretofore been difficulty in providing both sufficient thrust capacity between their engaging faces and means preventing their separation to avoid shock loading, rapid wear, and breakdown of the piston and connecting rod assembly.

One reason for separation of the connecting rod and piston in assembly as heretofore constructed has been that the connecting means for the piston and connecting rod has become deformed and has been subject to radial and axial movement relative to its support.

It is therefore an object of the present invention to overcome these disadvantages and provide a connecting rod and piston connected in thrust transmitting relation by means subject to a minimum of stress and to no movement relative to its supporting member.

Another object of the invention is to provide a piston and connecting rod assembly that is more economical to manufacture and assemble.

Another object of the invention is to provide in a piston and connecting rod assembly for a high pressure axial type pump a tie means rigidly secured in either the piston or connecting rod member and having a free end pivoted in the other member about the pivot center for these members.

Other objects and advantages of the invention will be apparent upon a reading of the following description with the accompanying drawings, in which.

Figure 1:
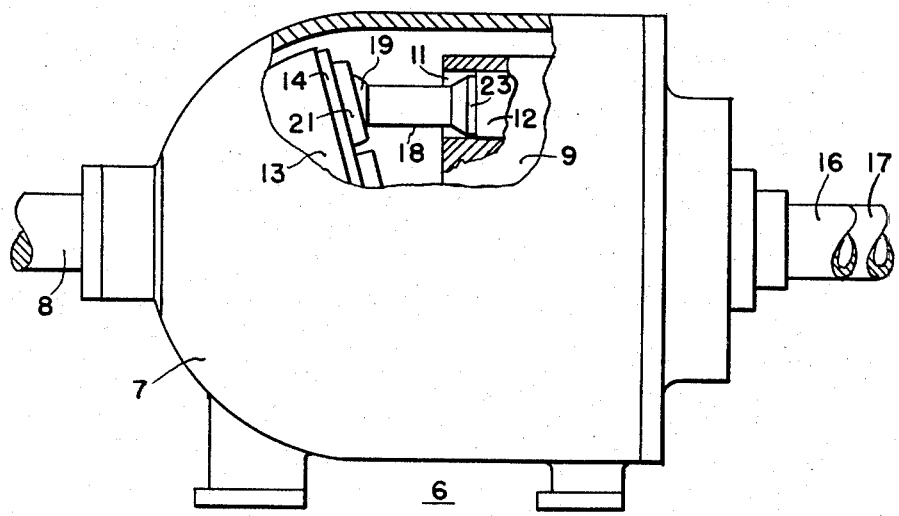
Fig. 1 is a view in elevation of a pump with portions broken away to show one of the piston and connecting rod assemblies.

Referring more particularly to the drawing by characters of reference, Fig. 1 shows a hydrodynamic machine 6 operable as a pump and as a motor embodying the present invention and hereinafter referred to as a pump. The pump 6 shown is an axial pump of the swash plate type.

The pump comprises a casing 7 having a drive shaft 8 journaled therein, and a cylinder barrel 9 fixed for rotation with shaft 8 in casing 7, in a well-known manner. A plurality of cylinders 11, only one of which appears in the drawing, are arranged in a circle concentrically of the axis of shaft 8. Each cylinder 11 has a piston 12 fitted and adapted to reciprocate therein to provide pumping of fluid through the pumps, as described in U.S. Patent No. 1,020,285.

A cradle or reaction member 13 is nonrotatable and is restrained from axial movement relative to shaft 8. A thrust member 14 is rotatably supported within the cradle about a point in the axis of shaft 8. The arrangement is such that cradle 13 and thrust member 14 may be inclined to the axis of the shaft 8 and the thrust member is rotated with the cylinders 11 through a universal joint not shown, so that rotation of the shaft 8, cylinder barrel 9, and thrust member 14 causes the pistons 12 to reciprocate in their cylinders 11 to an extent determined by the inclination of the thrust member relative to the axis of the shaft 8. Inward moving pistons 12 eject fluid from their cylinders to a pipe 16 or 17 and outward moving pistons 12 are supplied with fluid from pipes 17 or 16, respectively, in a known manner.

Means for transmitting thrust between the thrust member 14 and the piston elements includes a corresponding number of connecting elements. Each connecting element comprises a connecting rod 18 having an end forming a ball shaped head 19 that is fitted in a socket 20 of a spherical cap 21 which is fixed in thrust member 14 to provide a pivotal ball and socket connection therebetween. Spherical cap 21 overlies end head 19 and is fastened to thrust member to retain the end head in the socket.

The other end 23 of the connecting rod 18 has a spherical surface 24 in mating engagement with a complementary spherical surface 26 of an adjacent end of piston 12. The end head 23 of connecting rod 18 is also adapted to move in the cylinder 11 and in order to provide maximum bearing capacity the end head 23 is made nearly as large in diameter as the piston 12.

Figure 2:
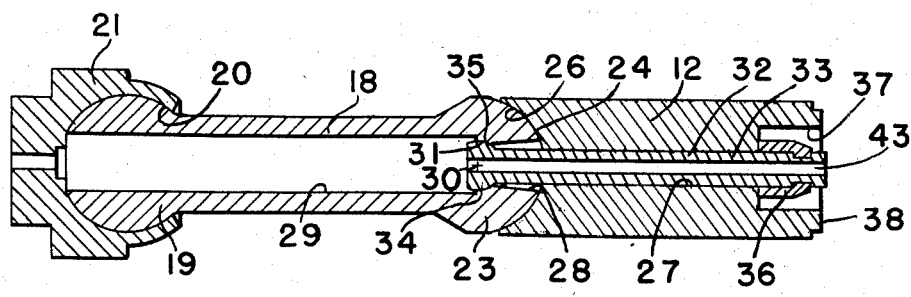
Fig. 2 is a view on a larger scale in longitudinal section of the connecting rod and piston and a tie member therefor of the pump shown in Fig. 1.
Figure 3:
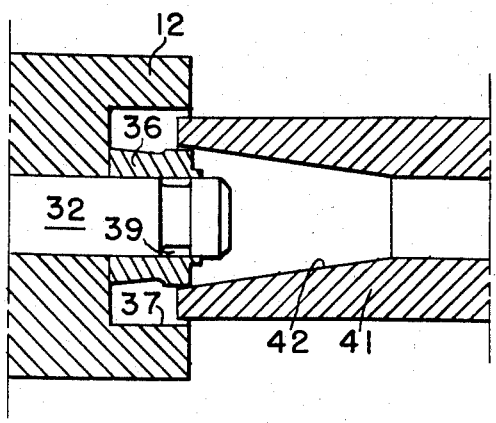
Fig. 3 is an enlarged cross-sectional view of a portion of the piston and connecting rod assembly of Fig. 2 preparatory to securing the tie member in the piston.

The piston and connecting rod assembly preferably are made as shown in Figs. 2 and 3 in which the piston 12 is provided with a concave spherical seat 26 and the end head 23 of the connecting rod is ball shaped to provide the mating spherical surface 24.

The piston and connecting rod are further constructed and arranged to receive tie means for securing them together and permitting universal pivotal movement therebetween to an extent determined by such tilting of the thrust member as provides maximum piston stroke upon rotation of shaft 8.

For such purposes the piston has an axial bore or passage 27 extending therethrough, and the connecting rod has a first coaxial bore 28 which extends through end head 23 and a second larger coaxial bore 29 which extends from the other end to a point in end head 23. The shoulder between the bores is shaped to provide a concave spherical surface 31 defining a ball receiving socket. The concave inner spherical surface 31 of the socket has a center of curvature 30 which is the same as the center of curvature for the convex outer spherical surface 24 of end head 23.

The tie means comprises a bolt or rod 32 having a shank 33 and an enlarged end or head 34. Head 34 of the tie rod has a ball shaped convex spherical surface 35 extending radially outward of the shank 33 and adapted for mating engagement with the inner spherical surface 31 within end head 23. The shank 33 of the tie rod extends through the bore 28 in the end head 23 and through the axial bore 27 in the piston. The shank of the tie rod fits closely in the bore 27 of the piston so that tie rod is radially rigidly supported therein. Means securing the tie rod against axial movement relative to the connecting rod and the piston is shown, Fig. 2, preferably as a clamp or collar 36 that abuts the shoulder of a counterbore 37 in the face 38 of the piston. The collar 36 has a portion disposed in a slot 39 in the shank of the tie rod. Slot 39 is an annular groove and collar 36 is an annular ring member which in assembling is slipped over the end of shank 33 and swaged into place. As shown in Fig. 3, a swaging member 41 has a conical bore 42 that fits over the leading edge of the collar and as the swaging member is forced axially over the collar to the left in Fig. 3, the collar, which is of soft metal relative to the metal in the shank, deforms and fills the slot 39 in the shank and thereby secures and locks the tie rod 32 in place to prevent separation of the engaging spherical surfaces 31, 35 between the tie rod and the connecting rod and the engaging spherical surfaces 24, 26 between the connecting rod and the piston and thereby holds the latter in thrust transmitting relation.

Although having different radii, the assembled connecting rod, piston, and tie rod thus have a common pivot center 30 about which the connecting rod is free to swing universally within the limits provided by the swash plate tilt. The bore 28 in the end head 23 of the connecting rod may be larger than the diameter of the shank 33 to prevent engagement of the wall of the bore with the shank within the limits of pivotal movement, which in the particular device described is of the order of 3½ degrees from a medial position or position of axial alignment. To provide such clearance the bore 28 is tapered as shown and the portion of the shank within the bore may also be reduced in diameter to provide pivotal clearance.

In order to provide lubrication for the pivot connections described, the tie rod 32 has an axial passage 43 extending therethrough so that fluid under pressure in its associated cylinder 11 will flow through the piston and connecting rod and maintain films of liquid between the mating surfaces at both ends of the connecting rod as well as between the mating surfaces of the tie rod and the connecting rod.

While only one embodiment of the invention has been shown and described, it will be apparent to one skilled in the art that changes and modifications may be made therein without departing from the spirit of the invention and from the scope of the appended claims.

I claim:

1. In a hydrodynamic machine comprising a thrust member, a cylinder, a piston element fitted in said cylinder, a connecting rod element subject to universal pivotal movement relative to said piston element and operatively connecting said thrust element with said piston element, said piston and connecting rod elements having engaging ends with mating spherical surfaces; the improvement comprising said one element whose mating end surface is convex having a concentric internal spherical surface defining a ball receiving socket, a tie member radially and axially rigid of the other said element and extending axially therefrom through its mating end surface, said tie member having a ball shaped end disposed in said ball receiving socket in mating engagement therewith to prevent separation of said piston and connecting rod elements and said mating spherical surfaces of said rod, piston and tie member defining a common pivot center for universal pivotal movement of said rod relative to said piston and tie member.

2. In a hydrodynamic machine having a thrust member, a cylinder, a piston fitted in said cylinder and having a passage extending therethrough, a spherical seat formed in an end of said piston concentric with said passage, a connecting rod having a spherical head disposed in mating engagement with said spherical seat, and means holding said rod head on the spherical seat of said piston; said holding means comprising an internal spherical surface formed concentrically within said spherical rod head, a tie member having an enlarged annular end presenting a spherical surface in mating engagement with said internal spherical surface, and a shank portion of said tie member extending through said rod head and closely fitted into said passageway in said piston, and means securing said tie member axially rigidly to said piston.

3. In a hydrodynamic machine having a thrust member, a cylinder, a piston fitted in said cylinder and having a passage extending therethrough, a spherical seat formed in an end of said piston concentric with said passage, a connecting rod having a spherical head disposed in mating engagement with said spherical seat, and means holding said rod head on the spherical seat of said piston; said holding means comprising a ball receiving socket formed within said rod head and having an internal spherical surface concentric with the outer spherical surface of said rod head, a tie rod having a ball shaped end in mating engagement with said socket and a shank extending through said rod head and said passage in said piston, and means mounted on said tie rod and abutting a portion of the other end of said piston to rigidly secure said tie rod to said piston and prevent separation of said connecting rod from said piston.

4. In a hydrodynamic machine comprising a thrust member, a cylinder, a piston fitted in said cylinder and having a passage extending therethrough, a spherical seat formed in an end of said piston concentric with said passage, a connecting rod having a spherical head having a radius substantially equal to the radius of said piston and adapted to reciprocate with said piston in said cylinder; the improvement comprising means preventing separation of said head from said seat, said means comprising a first coaxial bore through said head, a second larger coaxial bore through said connecting rod and extending to said head, a shoulder between said first and second bores defining a concave spherical surface within said head concentric with the outer said spherical surface of said head, a rigid tie member having an enlarged end with a spherical surface engaging the spherical surface of said shoulder and having a radius substantially equal thereto, said tie member having a shank portion extending through said first bore of said head and rigidly secured in said passage of said piston to hold said connecting rod and piston in thrust transmitting relation.

5. A piston and connecting rod assembly for a hydrodynamic machine including a thrust member and a cylinder open at the front end thereof and receiving said piston and a head of said connecting rod, said piston having a spherical seat formed in the end toward said thrust member, said head of said rod being spherical and disposed on said piston seat for universal movement therebetween about a pivot point, an internal spherical seat formed within the head of said rod and a bolt extending through said head and into said piston, said bolt having a spherical end portion seated on said internal seat of said rod for universal movement therebetween about said same pivot point, and means securing the other end of said bolt to said piston so that said spherical head of said connecting rod is securely held on said piston seat to thereby prevent separation of said connecting rod and piston.

6. In a hydrodynamic machine comprising a thrust member, a cylinder, a piston fitted in said cylinder, and a connecting rod operative between said thrust member and said piston, an end head for said rod and piston reciprocable with said piston in said cylinder and having mating spherical surfaces whose centers of curvature define a common pivot center on the axis of said cylinder and whose radii are substantially equal to the radius of said piston to provide a maximum bearing surface for thrust transmitted between said rod and said piston, said end head having a recess with a spherical surface therein, a tie member disposed in said piston along the axis thereof and rigidly secured radially and axially of said piston and extending into said end head, said tie member having an enlarged end portion having a spherical surface mating with said spherical surface in said recess which spherical surfaces have centers of curvature at said common pivot center so that said tie member holds said rod and piston together and limits the pivotal movement of said rod to said common pivot center.

7. In a hydrodynamic machine including a piston and connecting rod assembly described in claim 6, means securing said tie member axially of said piston comprises said tie member extending through said piston and having an annular groove adjacent a working face of said piston, a deformable ring of metal abutting said face of said piston and filling said annular groove in said tie member.

References Cited in the file of this patent

UNITED STATES PATENTS

| | | |
|---|---|---|
| 2,365,067 | Gauld | Dec. 12, 1944 |
| 2,638,850 | Ferris | May 19, 1953 |
| 2,752,214 | Ferris | June 26, 1956 |
| 2,847,261 | Cornelius | Aug. 12, 1958 |